Patented Nov. 11, 1947

2,430,736

UNITED STATES PATENT OFFICE 2,430,736

CRESYLIC ACID-FURFURAL SYNTHETIC RESIN BASE ADHESIVE

Donald V. Redfern, Seattle, Wash., assignor to Adhesive Products Company, Seattle, Wash.

No Drawing. Application December 4, 1942, Serial No. 467,909

8 Claims. (Cl. 260—7)

The invention relates to a new and useful resin base adhesive comprising a powdered alkaline-dispersible resin base composed of the reaction products of a phenol and/or its homologs and an aldehyde, with a modifying material, in an alkaline medium, and an absorbing material; together with other extending and/or alkaline dispersible materials.

Resin base glues used in the making of exterior grade plywood are, in general, quite expensive, but I have discovered that by a choice of materials heretofore thought not suitable for a plywood glue because of the treatment received in their manufacture, an extended resin base glue, cheaper to make and every bit as durable, can be obtained. This group of materials, which may be referred to as "extenders," includes heat-treated materials such as the insoluble blood of commerce which undergoes drastic heat treatment in its manufacture, and dried activated sewage sludge. A combination of the resin base with one or more of these heat-treated materials with or without a small percentage of those alkali dispersible materials commonly accepted as suitable plywood adhesive bases, such, for example, as casein, soluble blood albumen, and soya meal, makes a glue composition that will readily form an adhesive in alkaline media, which adhesive is spreadable by plant techniques now employed and which will form panels capable of passing the so-called Exterior test for moisture resistance (see National Bureau of Standards Commercial Standard Bulletin numbered CS45-38).

The choice of extenders and/or alkali-dispersible materials may be so varied as to produce an adhesive suitable not only for making an exterior grade of plywood, but also plywood of inferior grades, this grade depending partially upon the reactive properties of the particular extender or extenders and/or alkali-dispersible materials chosen, and also upon the relative proportions of resin base to said extending or alkali-dispersible materials used in the preparation of the adhesive composition.

Another point to be considered in relation to this invention is the matter of the now much-discussed "defense" situation. During the present emergency it is vital that existing "defense" materials be preserved. Resin-forming materials, an example of which is cresylic acid, must now be routed from less important commercial channels to more important government defense work. Hence any invention, such as the present one, which permits the use of lesser quantities of these much-needed materials to accomplish the same results as larger quantities have done heretofore, must necessarily assume significant importance.

The terms "extending material" and "alkaline-dispersible material" should herewith be defined in the sense in which they are used in this particular disclosure. By "extending material" is meant any dry material which is added to the dry resin base material in order to form a mixture suitable for use as an adhesive base. The term "alkaline-dispersible material" is applied to any dry material which is also suitable for admixture with the resin base material to form an adhesive base, but which is dispersible in an aqueous alkaline medium.

A representative list of suitable extending and/or alkali-dispersible materials follows:

1. Sulfur
2. Proteinous materials, such as
    Dried activated sludge
    Insoluble blood
    Soluble blood
    Casein
    Oleaginous seed meals, as such, heat-treated, or aldehyde-treated, examples of which are: peanut, cottonseed, flaxseed, soya.
3. Ligneous materials, such as lignin from waste sulfite liquor; Meadol (an alkaline soluble lignin product made by the Mead Corporation).
4. Cellulosic materials, such as wood flour.
5. Starch containing materials, such as Manioc; wheat flour.

It will be understood that the above list is representative only and is not intended as an enumeration of all possible extending and alkali-dispersing materials.

Soluble blood is a good example of alkaline-soluble protein, and insoluble blood is a good example of a partially alkaline-soluble protein; and the proteins listed in the above tabulation may be divided into two such groups. Alkaline-dispersible proteins are proteins which fall in the above classes of alkaline-soluble and partially alkaline-soluble proteins.

The resins disclosed herein and in applicant's above mentioned co-pending prior application are phenol-furfural resins. In order to add an extender such as those non-proteinous materials mentioned above and the partially alkaline-soluble proteins it is necessary to have present an alkaline-soluble protein to sustain these extenders in solution; and to use an alkaline-soluble protein without large amounts of buffering or neutralizing material it is also necessary to employ furfural instead of the more reactive aldehydes. The strong aldehydes such as formaldehyde immediately coagulate the protein when the two are mixed. The alkaline-soluble proteins may be extenders by themselves.

The materials used in my invention may be ground to any degree of fineness, but for the purposes of the present invention I find that the resin should be ground to pass at least through a one hundred-mesh (100) screen while the other materials should be fine enough to pass mostly through a one hundred and fifty-mesh (150) screen. However, the fineness of grind is a discretionary measure and I do not confine myself to any certain degree of comminution, so far as the invention in its broadest aspects is concerned.

Examples of adhesives made in accordance with the present invention are as follows:

*Example No. 1*

| | Parts by weight |
|---|---|
| Resin base | 30 |
| Soluble blood albumen | 20 |
| Insoluble blood | 50 |

These are mixed together in the dry state to form the dry glue base.

100 parts of this dry powder are then placed in a suitable mixer and 200 parts of water are added. This is mixed for three (3) minutes. 10 parts of caustic soda dissolved in 20 parts water are added and this is mixed for four (4) minutes. 10 parts of lime in suspension in 20 parts of water are then added and stirring is continued for three (3) more minutes. 25 parts of "N" grade silicate of soda are next added and stirred in the mixture for five (5) minutes.

10 parts of water are added at the end to complete the mix which is ready for use after it has been stirred for another three (3) minutes. When the mixing is completed a viscous material suitable for use as an adhesive is the result. This material is put on spreader rolls and the veneer to be used in the manufacture of the plywood is run through the rolls, said rolls having previously been adjusted for proper spread application. The panel is then hot-pressed at a pressure of one hundred seventy-five (175) pounds per square inch for a sufficient length of time to produce a good bond, the bonding time depending upon the particular type of panel construction. The press temperature should be around two hundred thirty-five degrees Fahrenheit (235° F.)

While panels made with the above adhesive form a much better bond when pressed on the hot press, I do not wish to confine the use of such an adhesive to hot pressing alone, as I have found that very good results may also be obtained by cold pressing operations.

The strength of five-ply panels made up with this adhesive (see Example No. 1) using Douglas fir veneer, all plies being one-tenth ($\frac{1}{10}$) of an inch thick, gave results on the Exterior test (see National Bureau of Standards Commercial Standard Bulletin numbered CS45-38) as follows:

| Panel Construction | No. Panels | Press Time, min. | Strength, lbs./sq.in. (average) | Per Cent Wood Failure (average) |
|---|---|---|---|---|
| 5 ply 1/10-in. Plys | 10 | 5 | 156 | 81 |

*Example No. 2*

| | Parts by weight |
|---|---|
| Resin base | 40 |
| Soluble blood | 10 |
| Insoluble blood | 50 |

These dry ingredients are mixed together to form the dry glue base as in Example No. 1 and are then mixed with the various chemicals in the same manner and proportions as was the dry base in Example No. 1.

Panels made with this glue in a manner similar to that described in Example No. 1 gave Exterior test results as follows:

| Panel Construction | Time Pressed, minutes | No. Panels Tested | Strength in lbs./sq.in. | Wood Failure, Per Cent |
|---|---|---|---|---|
| 5 ply 1/10-in. Plys | 4 | 1 | 168 | 100 |
| 3 ply 1/10-in. Plys | 3½ | 1 | 129 | 92 |
| 3 ply ¼-in. Plys | 5 | 2 | 176 | 91 |

The resin base for the two foregoing examples, its ingredients, and the manner in which they are combined, is set forth in my application Serial No. 457,650, filed September 8, 1942, entitled "Synthetic resin adhesive and process of making same," as follows:

(Parts by weight)

216 parts cresylic acid
32 parts sulfur
96 parts furfural
10 parts caustic soda dissolved in
20 parts water The above named materials are put in a reaction kettle fitted with a reflux condenser so that the water formed during the reaction period may be eliminated and any of the furfural or cresylic acid that may be carried over through the condenser and formed in a layer below the water to be eliminated, may be returned to the reaction kettle. The above named materials are heated to melt the sulfur herein used as the modifying agent, the caustic soda solution is then added and the mixture boiled for twenty five (25) minutes. One hundred (100) parts of insoluble blood (absorbing material) are then added and mixed in thoroughly and the resultant resin is poured onto trays to cool. After cooling, the resin is ground to pass at least a one hundred (100) mesh screen.

*Example No. 3*

For the glue produced in this example the resin contained ground dried activated sludge in place of the insoluble blood. The glue was made as described in Example No. 1. Exterior results on panels tested were as follows:

| Panel Construction | No. Panels | Press Time, min. | Strength, lbs./sq.in. (average) | Per Cent Wood Failure (average) |
|---|---|---|---|---|
| 5 ply 1/10-in. Plys | 10 | 5 | 158 | 60 |

*Example No. 4*

| | Parts by weight |
|---|---|
| Resin base as in foregoing examples | 13 |
| Soya flour | 40 |
| Casein | 27 |
| Insoluble blood | 8 |
| Trisodium phosphate | 8 |
| Sodium fluoride | 3 |
| Anti-foam | 1 |

The above mentioned dry ingredients are thoroughly mixed together to form the glue base;

100 parts of the above glue base are put into a suitable mixer and 285 parts of water are added; this is mixed for eight (8) minutes; 15 parts of lime in suspension in 30 parts of water are then added and stirring is continued for three (3) more minutes; 25 parts of sodium silicate ("N" grade) are next added and stirring is continued for three (3) minutes; 1½ parts of carbon disulfide are added, stirring is continued for three (3) minutes and the glue mixture is ready for use.

The strength of 5-ply panels made with this adhesive, using Douglas fir veneer, $\frac{1}{10}$-in. thick faces, ¼-in. thick cross bands, and ⅛-in. thick core, was as follows:

| No. of panels | Press Time, min. | Strength in lbs./sq.in. (average) | Per Cent Wood Failure (average) |
|---|---|---|---|
| 10 | 5 | 141 | 68 |

These examples are intended only to illustrate the adaptability and scope of the invention and do not limit it in any way. From an examination of the examples it can be seen that the amount of the resin base used in each case is extended greatly to produce a glue suitable for producing plywood.

I do not wish to limit myself to the binding together of plywood alone by the adhesive herein described as the adhesive is also useful for binding other porous materials such as wood joints, paper, fibrous materials for making floor coverings and the like.

I claim:

1. A thermo-setting dry powdered adhesive base, comprising: as a resin base an alkali-catalyzed heat condensation compound of cresylic acid, furfural, and an alkali-dispersible protein modifier; and in admixture with said base an alkali-dispersible protein extender.

2. A thermo-setting dry powdered adhesive base, comprising: as a resin base an alkali-catalyzed heat condensation compound of cresylic acid, furfural, and an alkali-dispersible protein modifier; and in admixture with said base an alkali-dispersible protein extender, and an alkali adapted to disperse said condensation compound and said extender in water.

3. A thermo-setting adhesive base, comprising: as a resin base an alkali-catalyzed heat condensation compound of cresylic acid, furfural, and an alkali-dispersible protein modifier; and in admixture with said base an alkali-dispersible protein extender, and an aqueous alkaline medium for containing and dispersing said condensation compound and said extender.

4. A thermo-setting dry powdered adhesive base, comprising: as a resin base an alkali-catalyzed heat condensation compound of cresylic acid, furfural, and an alkali-soluble protein modifier; and in admixture with said base a non-alkali-soluble extender.

5. A thermo-setting dry powdered adhesive base, comprising: as a resin base an alkali-catalyzed heat condensation compound of cresylic acid, furfural, and an alkali-soluble protein modifier; and in admixture with said base an alkali-soluble protein extender.

6. A thermo-setting dry powdered adhesive base, comprising: as a resin base an alkali-catalyzed heat condensation compound of cresylic acid, furfural, and an alkali-dispersible protein modifier; and in admixture with said base an alkali-soluble protein extender, and an alkali adapted to solubilize and disperse said condensation compound and said extender in water.

7. A thermo-setting dry powdered adhesive base, comprising: as a resin base an alkali-catalyzed heat condensation compound of cresylic acid, furfural, alkali, and an alkali-dispersible protein modifier, said phenol, furfural, and alkali being in the molar ratio of about 2:1:0.25; and in admixture with said base an alkali-dispersible protein extender.

8. A thermo-setting adhesive base, comprising: as a resin base an alkali-catalyzed heat condensation compound of cresylic acid, furfural, alkali, and an alkali-dispersible protein modifier, said phenol, furfural, and alkali being in the molar ratio of about 2:1:0.25; and in admixture with said base an alkali-dispersible protein extender, and an aqueous alkali medium for containing and dispersing said condensation compound and said extender.

DONALD V. REDFERN.

REFERENCES CITED

The following references are of record in the file of this patent:

UNITED STATES PATENTS

| Number | Name | Date |
|---|---|---|
| 1,771,033 | Ellis | July 22, 1930 |
| 1,771,553 | Arnot | July 29, 1930 |
| 1,884,747 | Knapp | Oct. 25, 1932 |
| 2,066,857 | Rozema | Jan. 5, 1937 |
| 2,292,624 | Fawthrop | Aug. 11, 1942 |
| 2,089,034 | Nevin | Aug. 3, 1937 |
| 2,141,313 | Osgood | Dec. 27, 1938 |

OTHER REFERENCES

U. S. Department of Agriculture: Forest Service, Forest Products Lab., Madison, Wisconsin; report No. 1336, "Synthetic Resin Glues," Dec. 1941.